July 28, 1936.   U. B. BRAY   2,049,046
METHOD OF SEPARATING ASPHALT AND WAX FROM OIL
Filed May 9, 1932
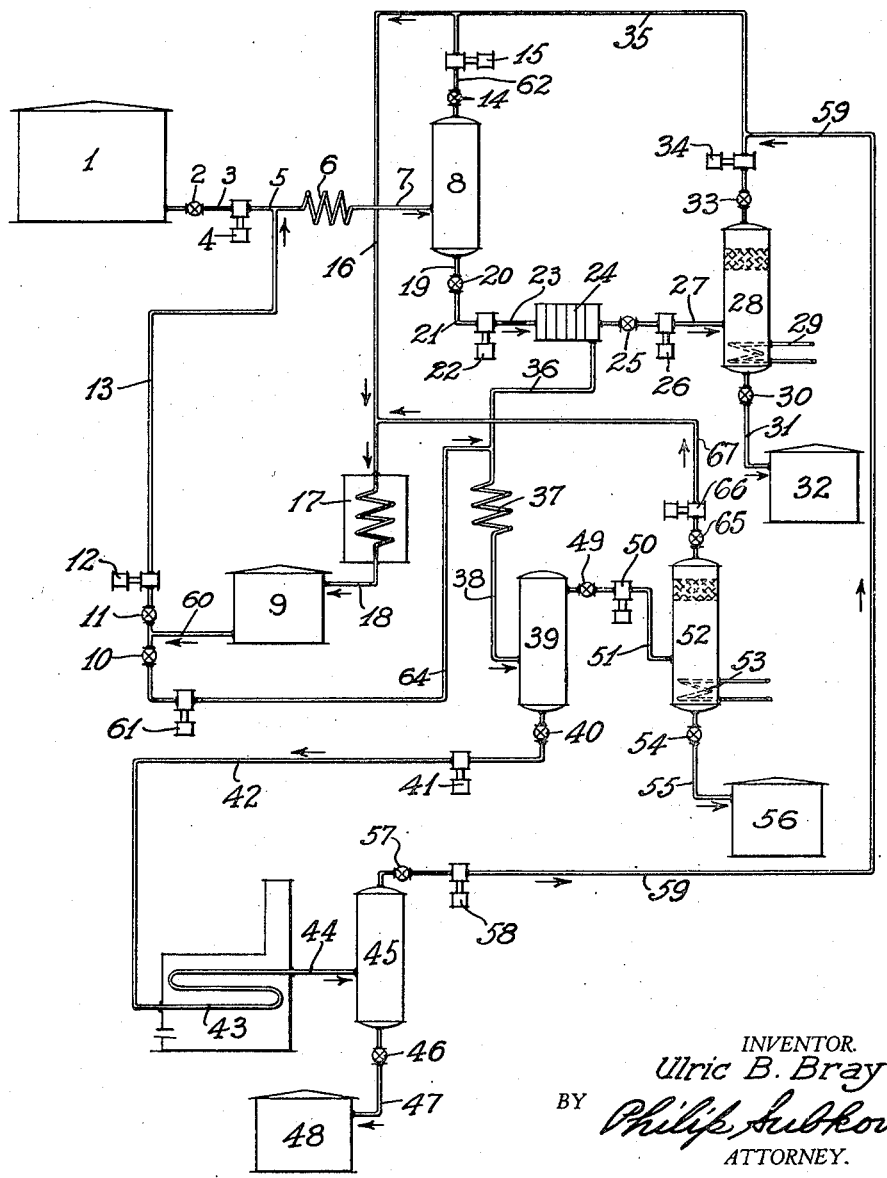
INVENTOR.
Ulric B. Bray
BY Philip Subkow
ATTORNEY.

Patented July 28, 1936

2,049,046

UNITED STATES PATENT OFFICE 2,049,046

METHOD OF SEPARATING ASPHALT AND WAX FROM OIL

Ulric B. Bray, Palos Verdes Estates, Calif., assignor to Union Oil Company of California, Los Angeles, Calif., a corporation of California Application May 9, 1932, Serial No. 610,130

21 Claims. (Cl. 196—13)

This invention relates to a process for the separation of asphalt and wax from oil. More specifically, it relates to a process of separating asphalt and wax from oil by the use of solvents. This application is a continuation in part of an application filed by Ulric B. Bray on July 7, 1930, Serial Number 466,189 for a Process for the production of lubricating oil from oils containing asphalt and wax. In the prior application asphaltic oils were treated with liquefied normally gaseous hydrocarbons, such as propane, ethane, butane and mixtures thereof for the separation of the asphalt from the oil. The solvent solution of oil was then chilled to a temperature sufficiently low to precipitate the wax and the precipitated wax was then removed from the oil dissolved in the liquefied normally gaseous hydrocarbon solvent.

Asphalt may be separated from oil either by distillation or solvent extraction. By the ordinary distillation methods the oil being more volatile than the asphalt is vaporized, condensed and recovered as a distillate. The asphalt which is substantially non-volatile at the temperature required to vaporize the oil remains in the still and is recovered as a residue. If wax is present in the oil it is partially distilled overhead in the medium and heavy overhead distillate fractions. A complete separation of this wax from the asphaltic residue cannot be obtained by ordinary distillation means owing to the high boiling point of certain of the paraffin or wax members present. If a further separation of the wax from the overhead distillates is desired, this is accomplished by such processes as cold settling, cold pressing or the centrifuge methods which are well known to those skilled in the art.

In employing solvent extraction for the separation of oil from asphalt solvents may be used in which the oil is relatively soluble and in which the asphalt is relatively insoluble. Thus when naphtha, gasoline or even the lighter hydrocarbons, such as liquid butane, propane or ethane, are employed as selective solvents to separate asphalt from oil the asphalt being substantially insoluble in the foregoing solvents is left as a residue and the oils are separated from this insoluble residue as solutions dissolved in the foregoing respective solvents. Where wax is present in the asphaltic oil this material is also separated in solution along with the solvent and oil. Providing it is desired to separate the wax from the oil and solvent this may be accomplished by chilling the solvent solution of oil by any appropriate means and then separating the precipitated wax by settling, filtering or centrifuging from the solvent solution of oil.

From the preceding description it can readily be seen that in order to separate oil from oil containing asphalt and wax two distinct separation steps must be employed. First the asphalt present must be separated from the oil and wax either by distillation or solvent extraction and secondly the waxy oil recovered from the distillation or solvent extraction step must be subjected to dewaxing methods in order to separate the wax from the oil.

I have discovered that it is unnecessary to separate oil from oil containing asphalt and wax by first separating the asphalt from the oil and wax and then separating the wax from the oil. I have found that asphalt and wax can be separated together or simultaneously from oils containing the same without some of the attending difficulties which are present in the two-step methods now employed and as described above.

When oil containing asphalt and wax is mixed with low molecular weight hydrocarbon solvents such as liquid propane there occurs a substantially complete separation of the asphalt from the oil and the wax present which dissolve in the liquid propane. If now a portion of the liquid propane is allowed to vaporize under reduced pressure the mass is chilled to a temperature sufficiently low to cause precipitation of the wax. The ebullition or boiling which accompanies the vaporization of the liquid propane causes a violent agitation of the mass and the small asphalt particles present offer themselves as nuclei for the agglomeration of the wax as it is precipitated at the lower temperatures attained. After a temperature has been reached, which is sufficiently low to cause thorough precipitation and agglomeration of the wax present, further vaporization of the light hydrocarbon solvent is prevented by imposing sufficient pressure upon the surface of the liquid to prevent further boiling. The agglomerated particles of asphalt and wax may then be separated from the solvent solution of oil by any suitable means, such as, settling, centrifuging or filtering. The oil dissolved in the solvent may be recovered by distilling out the light hydrocarbon solvent.

Furthermore, I may commingle the oil containing asphalt and wax in liquid propane under reduced pressure to precipitate the asphalt and wax together, separate the precipitated asphalt and wax from the propane solution of oil and then separate the solvent from the oil. The propane under reduced pressure is precooled and causes a simultaneous separation of the asphalt and wax from the oil.

I may also employ wax anti-solvents in conjunction with my process to facilitate the separation of the wax. For example a suitable wax anti-solvent may be dissolved in the liquid propane and this mixture may be commingled with the oil containing asphalt and wax to separate the asphalt and wax from the oil. Usually where wax anti-solvents are employed the amount of refrigeration necessary to cause thorough wax precipitation is materially lessened and in some cases may be completely eliminated. As wax anti-solvents I may employ methylene dichloride, methyl formate, alcohol, acetone, mixtures of acetone and benzol, mixtures of methylene dichloride and benzol.

By the term "propane", I intend to include such hydrocarbons as are normally vaporous at ordinary pressure and temperature. Such hydrocarbons include methane, ethane, propane, butane, isobutane and mixtures thereof. These volatile solvents may be obtained by rectification of casinghead gasoline by the so-called "stabilizing" method, now conventional in the natural gasoline industry. They are the overhead obtained. They are liquefied by compression and cooling in the conventional manner and drawn off into pressure chambers where they are maintained in a liquid state until used. A typical analysis of such a fraction is 6.72% ethane, 72.20% propane, 19.91% isobutane and 1.17% normal butane. Such a fraction may be maintained in a liquid state at a pressure of 125 pounds per square inch and a temperature of about 75° F. The predominating hydrocarbon member in this mixture is propane.

When it is desired to separate the wax from the precipitated asphalt-wax mixture this may be accomplished by washing the mixture with the light hydrocarbon solvent at normal temperature to dissolve the wax from the asphalt. The wax is then recovered from the hydrocarbon solution by distilling away the hydrocarbon solvent, or by refrigerating the solution and precipitating the wax therefrom.

As an alternative method of separating the wax from the asphalt I may distill the mixture and collect the wax as an overhead distillate and the asphalt as an unvaporized still residue.

In case it is desired to dispose of the coprecipitated asphalt-wax mixture as a fuel oil, the mixture may be submitted to cracking conditions sufficient to lower the viscosity to meet fuel oil specifications. At the same time wax crystallization inhibiting materials are formed by the cracking operation, in accordance with my patent application Serial No. 606,278, filed April 19, 1932, so that the cracked mixture is lower in pour point than would correspond to its wax content.

My process finds application in production of lubricating oil and especially in conjunction with Midcontinent or California crudes where there is a considerable quantity of asphalt and wax present in the oil. However, it is not restricted to the production of lubricating oil as it may be employed in conjunction with any oil where it is desirable to obtain a separation of the oil from the asphalt and wax.

It is, therefore, an object of my invention to coprecipitate asphalt and wax from oil containing these materials.

It is another object of my invention to separate asphalt and wax together from oil containing asphalt and wax by the use of solvents in which the oil is relatively soluble and the asphalt and wax relatively insoluble.

Figure 1 is illustrative of one form of apparatus in which I may carry out my process.

Referring more particularly to the drawing, oil containing asphalt and wax in tank 1 is withdrawn through valve 2 and line 3 to pump 4 which forces it through line 5 into agitator 6 where it is mixed with a stream of liquid propane coming from tank 9 through line 60, valve 11, pump 12 and line 13. After thorough agitation of the oil and liquid propane in agitator 6 the mass passes through line 7 into chiller 8 where the temperature of the mass is lowered sufficiently to complete thorough precipitation of the wax by allowing a portion of the liquid propane to vaporize through valve 14, line 62 into compressor 15 which forces it through line 16 to condenser 17 where it is liquefied and passes by means of line 18 into propane storage tank 9.

During the chilling operation in chiller 8 sufficient agitation is produced by the boiling liquid to cause intimate contact between the small precipitated asphalt particles and the precipitated wax. The asphalt particles function as nuclei to agglomerate the precipitated wax. The agglomerated mixture of asphalt and wax along with the propane solution of oil is removed through line 19, valve 20 and line 21 to pump 22 which forces it through line 23 into filter press 24 where the agglomerated asphalt and wax is separated from the propane solution of oil.

Propane solution of oil is removed from filter press 24 through valve 25 to pump 26 which forces it through line 27 into vaporizer 28 where by the aid of heat propane is vaporized from the oil and passes by means of valve 33 to compressor 34 which forces it through line 35 and line 16 to condenser 17 where it is liquefied and passes by means of line 18 into propane storage tank 9. The oil free from asphalt and wax is removed from vaporizer 28 through valve 30 and line 31 to storage tank 32.

The agglomerated mixture of asphalt and wax passes by means of line 36 into agitator 37 where it is thoroughly washed with liquid propane coming from tank 9 through line 60, valve 10, pump 61 and line 64. The thoroughly washed mixture of asphalt and wax passes from agitator 37 by means of line 38 into settling chamber 39 where the insoluble asphalt settles out and is removed through valve 40 to pump 41 which forces it through line 42 into heater 43 where the temperature of the mass is raised sufficiently high to vaporize all the propane present. The heated mass passes from heater 43 through line 44 into separator 45 where the molten asphaltic material is removed through valve 46 and line 47 to storage tank 48. The separated propane vapor in separator 45 is removed through valve 57 to compressor 58 which forces it through lines 59, 35 and 16 to condenser 17 where it is liquefied and passes by means of line 18 to propane storage tank 9. The propane solution of wax passes from settling chamber 39 via line 51 controlled by valve 52 and pump 50 into vaporizer 52 where the propane is vaporized, aided by steam circulating through closed coil 53. The vaporized propane is withdrawn via line 67 controlled by valve 65 and pump 66 and passed to condenser 17, line 18 into propane storage tank 9. The wax is withdrawn from the bottom of the vaporizer 52 and passed via line 55 controlled by valve 54 into storage tank 56.

As an example of the preferred method of carrying out my process, crude oil containing wax produced from the Santa Fe Springs field, California is distilled to separate all of the light fractions present such as gasoline, kerosene and gas oil. The residuum having a gravity at 60° F. of 21.1 and a Saybolt Universal viscosity of 280 seconds at 210° F. is withdrawn from tank 1 and mixed in line 5 with about 4 volumes of propane withdrawn from tank 9. This is sufficient to completely dissolve the oil and wax. The mixture of propane and asphaltic oil residue containing wax is then thoroughly mixed in agitator 6 and thence it is sent to cooling chamber 9 where about 2 volumes of the propane is allowed to vaporize under reduced pressure. The temperature obtained will then be sufficiently low to cause a substantial precipitation of the wax present, i. e. from 0° F. to −100° F.

The ebullition or boiling chamber 9 insures a good contact for the precipitated asphalt and wax and this results in an agglomeration of these two materials. The chilled mass is then withdrawn from the chilling chamber 9 and passes to filter press 24 where the precipitated asphalt and wax is separated from the propane solution of oil. The propane solution of oil passes to vaporizer 28 where the propane is vaporized and sent back to storage tank 9 and the asphalt- and wax-free oil passes to tank 32.

The asphalt and wax mixture is removed from filter 24 and passes into line 36 where it is mixed with propane in the proportion of one volume of the asphalt-wax mixture to three volumes of propane. This mixture then passes to agitator 37 where it is thoroughly agitated, after which the mass passes to settling chamber 39 where the asphalt is withdrawn and sent to the means shown for distilling off the propane from the asphalt. The propane solution of wax passes from settling chamber 39 to vaporizer 52 where the propane is vaporized and returned to storage tank 9 via line 67 controlled by valve 65, pump 66, condenser 17 and line 18. The wax is withdrawn from the bottom of vaporizer 52 and passed via line 55 controlled by valve 54 into storage tank 56.

The above description is not to be taken as limiting, but merely as illustrative of one mode of carrying out my process, as many variations may be made by a man skilled in the art within the scope of the following claims.

I claim:

1. A process for the separation of asphalt and wax from an oil containing the same which comprises commingling said oil with a liquefied normally gaseous hydrocarbon, chilling the oil to a temperature sufficiently low to co-precipitate the asphalt and wax, removing the asphalt and wax from the oil dissolved in the liquefied normally gaseous hydrocarbon and separating the liquefied normally gaseous hydrocarbon from the oil.

2. A process for the separation of asphalt and wax from oil which comprises commingling said oil with a liquefied normally gaseous hydrocarbon solvent and without removing the asphalt from the solvent solution of oil and wax, chilling said oil commingled with said solvent to separate the asphalt and the wax, and removing the asphalt and wax from the oil and solvent.

3. A process for the separation of asphalt and wax from oil which comprises commingling said oil under superatmospheric pressure with a liquefied normally gaseous hydrocarbon solvent and without removing the asphalt from the solvent solution of oil and wax, releasing the pressure and vaporizing a portion of the solvent to chill the oil and separate the asphalt and wax, and removing the asphalt and wax from the oil dissolved in the solvent.

4. A process for the separation of asphalt and wax from oil which comprises commingling said oil with a liquefied normally gaseous hydrocarbon solvent under superatmospheric pressure to dissolve the oil and wax and cause a separation of the asphalt and without removing the asphalt from the solvent solution of oil and wax, chilling the oil commingled with said solvent to cause a precipitation of wax, and simultaneously removing the asphalt and wax from the oil and solvent.

5. A process for the separation of asphalt and wax from oil which comprises commingling said oil with a liquefied normally gaseous hydrocarbon solvent under superatmospheric pressure to dissolve the oil and wax and cause a separation of the asphalt and without removing the asphalt from the solvent solution of oil and wax, releasing the pressure and vaporizing a portion of the solvent to chill the oil and precipitate the wax, and simultaneously removing the asphalt and wax from the oil and remaining solvent.

6. A process for the separation of asphalt and wax from oil which comprises commingling said oil with a liquefied normally gaseous hydrocarbon solvent to dissolve the oil but at a temperature sufficiently low to cause a separation of the asphalt and wax and then removing the asphalt and wax from the solvent solution and oil.

7. A process as in claim 6 in which the solvent is a liquefied normally gaseous hydrocarbon containing a major portion of propane.

8. A process as in claim 6 in which the solvent is a liquefied normally gaseous hydrocarbon containing a major portion of hydrocarbons having less than four carbon atoms.

9. A process as in claim 6 in which the solvent is liquid propane.

10. A process for the separation of asphalt and wax from oil which comprises commingling said oil with a liquefied normally gaseous hydrocarbon solvent containing a major portion of propane and without removing the asphalt from the solvent solution of oil and wax, chilling said oil commingled with said solvent to separate the asphalt and wax, and removing the asphalt and wax from the oil dissolved in the solvent.

11. A process for the separation of asphalt and wax from oil which comprises commingling said oil with a liquefied normally gaseous hydrocarbon solvent containing a major portion of hydrocarbons of less than four carbon atoms, and without removing the asphalt from the solvent solution of oil and wax, chilling said oil commingled with said solvent to separate the asphalt and wax, and removing the asphalt and wax from the oil and solvent.

12. A process for the separation of asphalt and wax from oil which comprises commingling said oil with liquefied normally gaseous hydrocarbon solvent containing a major portion of hydrocarbons of less than three carbon atoms and without removing the asphalt from the solvent solution of oil and wax, chilling said oil commingled with said solvent to separate the asphalt and wax, and removing the asphalt and wax from the oil dissolved in the solvent.

13. A process for the separation of asphalt and wax from oil which comprises commingling said oil with liquid propane and without removing the asphalt from the solvent solution of oil and wax, chilling said oil commingled with liquid propane to separate the asphalt and wax, and removing the asphalt and wax from the oil and liquid propane.

14. A process for the separation of asphalt and wax from oil which comprises commingling said oil under superatmospheric pressure with a liquefied normally gaseous hydrocarbon solvent containing a major portion of propane and without removing the asphalt from the solvent solution of oil and wax, releasing the pressure and vaporizing a portion of the solvent to chill the oil and separate the asphalt and wax, and removing the asphalt and wax from the oil dissolved in the remaining solvent.

15. A process for the separation of asphalt and wax from oil which comprises commingling said oil with a liquefied normally gaseous hydrocarbon solvent containing a major portion of hydrocarbons of less than four carbon atoms and without removing the asphalt from the solvent solution of oil and wax, releasing the pressure and vaporizing a portion of the solvent to chill the oil and precipitate asphalt and wax, and removing the asphalt and wax from the oil dissolved in the remaining solvent.

16. A process for the separation of asphalt and wax from oil which comprises commingling said oil with liquid propane and without removing the asphalt from the solvent solution of oil and wax, releasing the pressure and vaporizing a portion of the liquid propane to chill the oil and separate the asphalt and wax, and removing the asphalt and wax from the oil dissolved in the remaining propane.

17. A process for the separation of asphalt and wax from oil which comprises commingling said oil with liquid propane to dissolve the oil and wax and cause a separation of asphalt and without removing the asphalt from the solvent solution of oil and wax, cooling the oil commingled with the propane to a temperature sufficiently low to separate the wax, and simultaneously removing the asphalt and wax from the oil and liquid propane.

18. A process for the separation of asphalt and wax from oil which comprises commingling said oil with liquid propane to dissolve the oil and wax and precipitate asphalt and without removing the asphalt from the solvent solution of oil and wax, vaporizing a portion of the propane from the commingled oil and propane to chill the oil and precipitate the wax, and simultaneously removing the precipitated wax and asphalt from the oil and remaining propane.

19. A method for the separation of asphalt and wax from oil which comprises extracting said oil with a liquefied normally gaseous hydrocarbon solvent consisting of the major portion of hydrocarbons of less than four carbon atoms to cause a separation of the asphalt and without removing the asphalt from the solvent solution of oil and wax, vaporizing a portion of said hydrocarbon solvent from the solvent solution of oil and wax to chill the oil and precipitate the wax, and simultaneously separating the asphalt and wax from the oil and remaining solvent.

20. A method for separating asphalt and wax from oil which comprises commingling said oil with a liquefied hydrocarbon solvent, the major portion of which is propane to separate asphalt and without removing the asphalt from the solvent solution of oil and wax, vaporizing a portion of said solvent to chill the oil and precipitate the wax, and simultaneously removing the asphalt and wax from the oil and remaining solvent.

21. A process for the separation of asphalt and wax from oil containing the same which comprises commingling said oil with a normally gaseous liquid hydrocarbon solvent and a wax antisolvent to separate the asphalt and wax, and removing the asphalt and wax from the mixture.

ULRIC B. BRAY.

CERTIFICATE OF CORRECTION.

Patent No. 2,049,046.  July 28, 1936.

ULRIC B. BRAY.

It is hereby certified that error appears in the printed specification of the above numbered patent requiring correction as follows: Page 3, first column, lines 69 and 70; same page, second column, lines 2, 3 and 4, lines 50 and 51, and lines 71 and 72; page 4, first column, lines 3, 4 and 5, lines 13, 14 and 15, lines 24, 25 and 26, and lines 33, 34 and 35, claims 2, 3, 10, 12, 13, 14, 15, and 16 respectively, for the words "and without removing the asphalt from the solvent solution of oil and wax" read and without separation of asphalt; page 3, second column, lines 59, 60 and 61, claim 11, for the comma and words ", and without removing the asphalt from the solvent solution of oil and wax" read and without separation of asphalt; and that the said Letters Patent should be read with these corrections therein that the same may conform to the record of the case in the Patent Office.

Signed and sealed this 2nd day of March, A. D. 1937.

(Seal)

Henry Van Arsdale
Acting Commissioner of Patents.